(12) United States Patent
Hamid et al.

(10) Patent No.: US 12,725,059 B2
(45) Date of Patent: Sep. 1, 2026

(54) INTELLIGENT SELECTOR CONTROL FOR USER INTERFACES

(71) Applicants: Atlassian Pty Ltd., Sydney (AU); Atlassian US, Inc., San Francisco, CA (US)

(72) Inventors: Shihab Hassan Hamid, Sydney (AU); Addo Wondo, Sydney (AU); Neil Christopher Summers, San Mateo, CA (US); Joshua Adam Hansen, Sydney (AU); Geoff Sims, Sydney (AU); Hao Ye, Sunnyvale, CA (US); Gaurav Awadhwal, Sydney (AU); Penyo Atanasov, Sydney (AU); Ahmed Saad, Sydney (AU); Alexander McCarthy, Sydney (AU); Sreeraj Arakkal, Sydney (AU)

(73) Assignees: ATLASSIAN PTY LTD, Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 19/096,569

(22) Filed: Mar. 31, 2025

(65) Prior Publication Data

US 2025/0225418 A1 Jul. 10, 2025

Related U.S. Application Data

(63) Continuation of application No. 18/105,720, filed on Feb. 3, 2023, now Pat. No. 12,265,923, which is a (Continued)

(51) Int. Cl.
*G06F 17/00* (2019.01)
*G06F 16/903* (2019.01)
(Continued)

(52) U.S. Cl.
CPC ......... *G06N 5/04* (2013.01); *G06F 16/90344* (2019.01); *G06F 16/9038* (2019.01); *G06F 16/953* (2019.01); *G06N 20/00* (2019.01)

(58) Field of Classification Search
CPC .......... G06N 5/04; G06N 20/00; G06N 20/20; G06F 16/90344; G06F 16/9038; G06F 16/953; G06F 16/337; G06Q 10/101
See application file for complete search history.

(56) References Cited

U.S. PATENT DOCUMENTS 11,182,058 B2 11/2021 Wong et al.
11,200,152 B2 12/2021 Tanaka et al.
(Continued)

OTHER PUBLICATIONS

Chi-Yin Chow, Jie Bao, and Mohamed F. Mokbel. Towards location-based social networking services. In Proceedings of the 2nd ACM SIGSPATIAL International Workshop on Location Based Social Networks (LBSN '10). Association for Computing Machinery, 31-38. <https://doi.org/10.1145/1867699.1867706>, Nov (Year: 2010).*

*Primary Examiner* — Greta L Robinson
(74) *Attorney, Agent, or Firm* — Brownstein Hyatt Farber Schreck, LLP

(57) ABSTRACT

Methods and systems for intelligently recommending selections for a selector control are disclosed. The method includes receiving a recommendation request from a selector control client, the recommendation request comprising a search string and a unique identifier of a user interacting with a selector control; identifying user identifiers of usernames matching the search string; retrieving machine learning features corresponding to the user identifiers of usernames matching the search string; applying a machine learning model to the retrieved machine learning features to assign weights to the retrieved machine learning features; computing recommendation scores for the user identifiers based on the assigned weights to the retrieved machine
(Continued)

learning features; ranking the user identifiers based on the recommendation scores; and forwarding a ranked list of user identifiers to the selector control client for displaying in the selector control for selection by the user interacting with the selector control.

20 Claims, 5 Drawing Sheets

Related U.S. Application Data continuation of application No. 16/914,043, filed on Jun. 26, 2020, now Pat. No. 11,574,218.

(51) Int. Cl.

| | |
|---|---|
| ***G06F 16/9038*** | (2019.01) |
| ***G06F 16/953*** | (2019.01) |
| ***G06N 5/04*** | (2023.01) |
| ***G06N 20/00*** | (2019.01) |

(56) References Cited

U.S. PATENT DOCUMENTS

| | | | | |
|---|---|---|---|---|
| 11,392,593 | B2 * | 7/2022 | Kamotsky | G06N 20/00 |
| 11,442,947 | B2 * | 9/2022 | Wan | G06N 3/04 |
| 11,551,119 | B2 * | 1/2023 | Sathya | G06N 5/04 |
| 11,574,218 | B2 | 2/2023 | Hamid et al. | |
| 11,720,573 | B2 | 8/2023 | Wondo et al. | |
| 11,816,720 | B1 * | 11/2023 | Fernandez Galan | G06F 16/24578 |
| 2017/0024663 | A1 * | 1/2017 | Liu | G06N 20/00 |
| 2018/0115603 | A1 | 4/2018 | Hu et al. | |
| 2019/0080347 | A1 * | 3/2019 | Smith | G06Q 30/0269 |
| 2019/0108275 | A1 | 4/2019 | Gulli et al. | |
| 2019/0205465 | A1 | 7/2019 | Kulkarni | |
| 2021/0149893 | A1 | 5/2021 | Sehgal et al. | |
| 2021/0233148 | A1 * | 7/2021 | Govindan | G06N 20/00 |
| 2021/0406838 | A1 | 12/2021 | Ramanath et al. | |

* cited by examiner

INTELLIGENT SELECTOR CONTROL FOR USER INTERFACES

CROSS-REFERENCE TO RELATED APPLICATION(S)

This application is a continuation patent application of U.S. patent application Ser. No. 18/105,720, filed Feb. 3, 2023 and titled "Intelligent Selector Control for User Interfaces," which is a continuation patent application of U.S. patent application Ser. No. 16/914,043, filed Jun. 26, 2020 and titled "Intelligent Selector Control for user Interfaces," now U.S. Pat. No. 11,574,218, the disclosures of which are hereby incorporated herein by reference in their entireties.

TECHNICAL FIELD

Aspects of the present disclosure are directed to improved user interfaces and in particular to an intelligent selector control for user interfaces.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Computer systems, when executing a computer program, often provide a user-interface. The user interface includes a graphical program interface that is part of the executing computer program, which typically includes one or more input controls for a user to input data into the computer system. The systems and techniques described herein are directed to input controls that may be able to provide intelligent or curated suggestions or results to the user.

SUMMARY

Some example embodiments are directed to a computer-implemented method. A recommendation request may be received from a selector control client. The recommendation request may include a search string and a unique identifier of a user interacting with a selector control. User identifiers of usernames may be identified that match the search string. Machine learning features corresponding to the user identifiers of usernames matching the search string may be retrieved. A machine learning model may be applied to the retrieved machine learning features to assign weights to the retrieved machine learning features. Recommendation scores for the user identifiers may be computed based on the assigned weights to the retrieved machine learning features. The user identifiers may be ranked based on the recommendation scores. A ranked list of user identifiers may be forwarded to the selector control client for displaying in the selector control for selection by the user interacting with the selector control.

Some example embodiments are directed to a computer processing system comprising: one or more processing units, one or more communication interfaces, and a non-transient computer-readable storage medium storing sequences of instructions, which when executed by the one or more processing units, cause the one or more processing units to perform a set of operations. The operations may include: receiving a recommendation request from a selector control client, the recommendation request comprising a search string and a unique identifier of a user interacting with a selector control; identifying user identifiers of usernames matching the search string; retrieving machine learning features corresponding to the user identifiers of usernames matching the search string; applying a machine learning model to the retrieved machine learning features to assign weights to the retrieved machine learning features; computing recommendation scores for the user identifiers based on the assigned weights to the retrieved machine learning features; ranking the user identifiers based on the recommendation scores; and forwarding a ranked list of user identifiers to the selector control client for displaying in the selector control for selection by the user interacting with the selector control.

Some example embodiments are directed to a computer-implemented method. The computer-implemented method may include: receiving a recommendation request from a selector control client, the recommendation request comprising a unique identifier of a user interacting with a selector control; retrieving user-to-user collaboration features corresponding to the unique identifier of the user interacting with the selector control. The user-to-user features may include counts of the number of times the user collaborated with collaborators in a given time period. The computer-implemented method may also include computing collaboration scores for the collaborators identified in the user-to-user collaboration features, based on the counts of the user-to-user collaboration features; ranking the collaborators based on the collaboration scores; and forwarding a ranked list of collaborators to the selector control client for displaying in the selector control for selection by the user interacting with the selector control.

Figure 1:
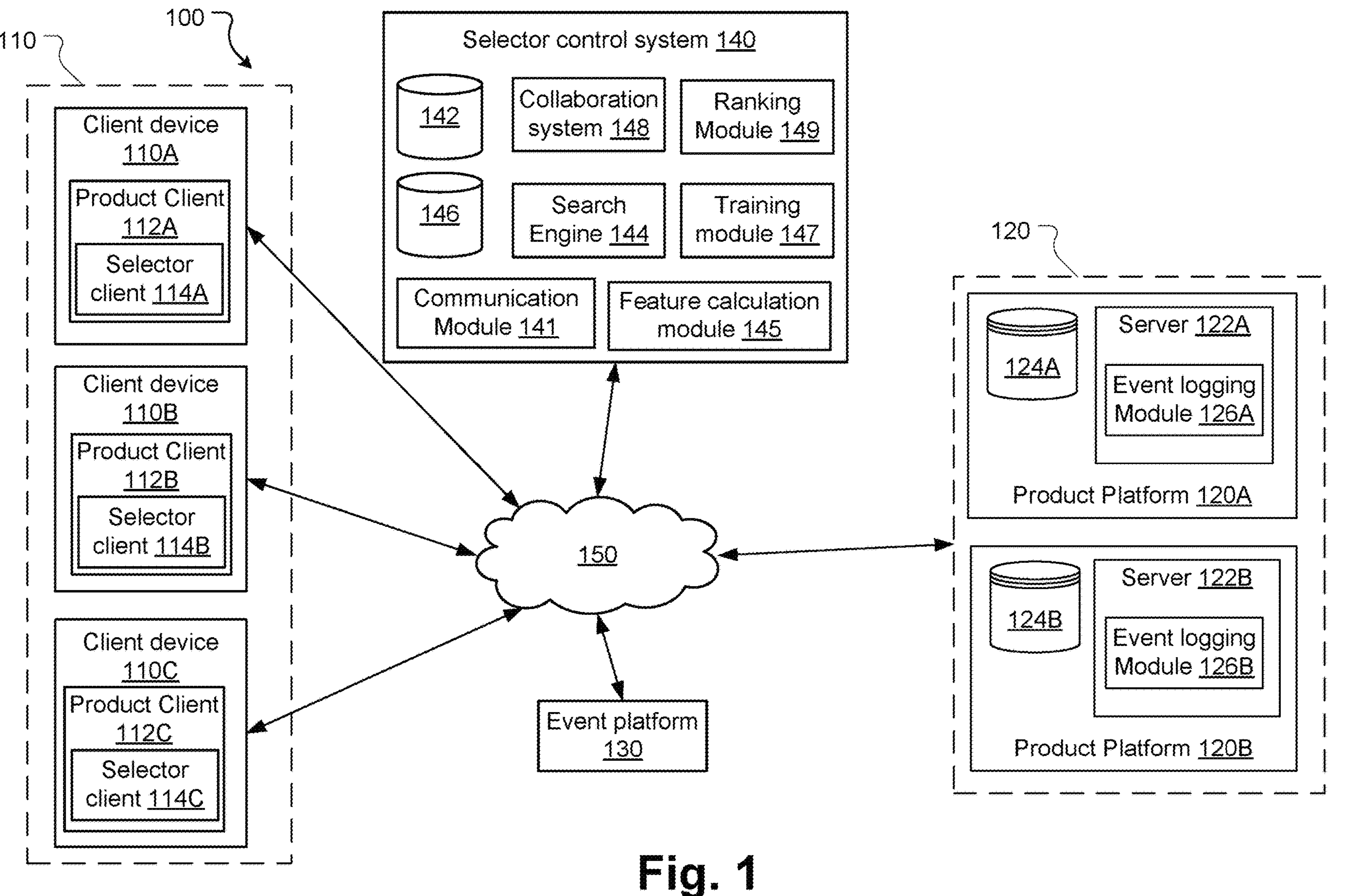
FIG. 1 is a block diagram of a networked environment according to some embodiments of the present disclosure.

While the invention is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the spirit and scope of the present invention as defined by the appended claims.

DETAILED DESCRIPTION

In the following description, for the purposes of explanation, numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

Computer systems, when executing a computer program, often provide a user-interface. The user interface may include a graphical program interface that is part of the executing computer program, which may include one or more input controls for a user to input data into the computer system, including e.g., checkbox controls (to select an item), a drop-down list controls, which allow users to select an item from a list of values, and text boxes or text area controls that allow users to enter free form text. In addition, a user interface may also include picker or selector controls. A selector control may include a text area to accept search characters and returns results from an underlying database that match the entered search characters. Users can then pick or select an item from the returned results. If the selector control does not return results that the user was looking for, the user can update the search query to retrieve more relevant results.

A selector control can return values from the searched database that are closest to the typed query and in some instances may be filtered based on the context in which the selector control is used. However, some selector control implementations require a user to enter enough number of characters to provide relevant results. Additionally, even when these selector controls return results based on a search string they might not provide relevant results at the top of the list and the user may have to scroll through the displayed results to identify the item(s) the user is interested in selecting.

Some selector controls allow users to select items from an underlying database. Consider the example of a selector control that is used to select a user—e.g., to assign a particular task to the user, to mention the user, or to share a content item with the user within an organization. In these cases, if the organization employs thousands if not hundreds of thousands of employees, the underlying database from within which results are to be displayed in the selector control can be very large. If the user does not enter any text, the selector control may present the entire collection of entries in the database sorted alphabetically or based on some other parameter. This can be very time consuming to sift through to identify the person the user wishes to select. In such cases, users may enter a few characters in the search text area to refine the list of results. For example, the user might enter the text "John". However, if the company has 50 employees having "John" as a first middle or last name, the selector control may return a list of all 50 employees—sorted based on a degree of match between the query and the person's name—e.g., employees whose first names are John may be shown first, followed by employees whose names include the word "John", e.g., Jonathans, and then followed by employee names that have the word John in their middle or last names. This is an example and the results returned may depend on the rules of the underlying search engine. In any event, the selector control returns a large list of potential employees that the user can select. Again, in this case the user would have to sift through a large list of names to find the particular "John" they were looking for and select that John.

Some selector controls may be configured to return a list of users that the selector selects most often. This might be efficient in social media situations where a user always shares the content items with the same people and/or mentions the same people frequently. However, in team-based organizations where a user may work with different teams and may frequently assign issues in one project to the same 2-3 people, but to different people in other projects, ordering the list of results based on how often a selector selects a person may not always return the most accurate results at the top of the list. This is because, a selector might work more extensively in one project and assign 50 issues in that project on a daily basis, but infrequently work on another project where he occasionally assigns projects. In this case, the people that the selector assigns issues to in the first project may always appear at the top of the returned results (because they are selected more often) irrespective of the project in which a selector wishes to assign issues.

Accordingly, some selector controls can be inefficient and provide an unsatisfactory user experience. It would be desirable to have a selector control that can return only a few recommended results, which the selector is most likely to select towards the top of the returned list without the selector having to enter extensive search characters in the search text area.

To address one or more of these issues, embodiments of the present disclosure provide an intelligent selector control that not only takes the selector into consideration but also the context in which the selector control and returns a list of sorted results that are most relevant to that particular selector in that particular context.

To do this, the selector control of the present disclosure employs a powerful backend system that continuously monitors interactions of users with the product platforms on which the selector control is executed and interactions of users with other users on that platform to predict the most likely selections a selector may wish to make via the selector control and provides a list of results to the selector control based on this prediction. Further, each time the user makes a selection via the selector control, the selection is passed back to the system as feedback to improve the predictability of the system.

In this manner the intelligent SCS provides more relevant results in the selector control thereby reducing the amount of time a selector spends reviewing the results and selecting the desired item.

These and other aspects of the present disclosure will be described in detail with reference to FIGS. 1-5 below.

FIG. 1 illustrates an environment 100 in which one or more aspects of the present disclosure are implemented. Specifically, FIG. 1 illustrates the various systems involved in creating and using a smart selector control according to embodiments of the present disclosure. The systems include client devices (e.g., client devices 110A, 110B, and 110C, collectively referred to as client devices 110), product platforms (e.g., product platforms 120A and 120B, collectively referred to as product platforms 120), an event platform 130, and a selector control system (SCS) 140. The client devices 110, product platforms 120, event platform 130 and SCS 140 communicate with each other over one or more communication networks 150.

The client device 110 may be any suitable device, for example a mobile device (e.g. a tablet or mobile phone), a portable device (such as laptop computer), or any other computing device (e.g. a desktop computer).

As illustrated in FIG. 1, each client device 110 includes one or more product clients 112 configured to access software applications made available by the product platforms 120. The clients 112 may communicate with applications hosted by the product platforms 120, render user interfaces based on instructions received from those applications, and receive inputs from user accounts allowing them to interact with the applications hosted by the product platforms 120. In certain embodiments, the clients 112 render user interfaces that include a smart selector control of the present disclosure and allow users to make selections via the smart selector control.

In addition, each client application 112 includes a selector control client 114. The selector control client 114 is associated with the selector controls present in user interfaces rendered by the product client 112. The selector control client 114 is configured to retrieve context data, user identifier of the selector and any query string entered by the selector in the selector control and forward this data to the SCS 140. Further, the selector control client 114 is configured to receive a list of items from the SCS 140 and render these for display in the selector control graphical element displayed on the client device 110.

The client applications 112 may be implemented in various ways. For example, the client applications 112 may be web browser applications (such as, for example, Chrome, Safari, Internet Explorer, Opera) which access the applications hosted by the product platforms 120 via appropriate uniform resource locators (URL) and communicate with these systems via general world-wide-web protocols (e.g. HTTP, HTTPS, FTP). In this case, the web browser application is configured to request, render and display user interfaces that conform to a markup language such as HTML, XML or extensions, and may be capable of internally executing browser-executable code such as JAVASCRIPT, or other forms of code. Alternatively, the client applications may be specific applications programmed to communicate with the product platforms 120 using defined application programming interface (API) calls.

In general, each product platform 120 is a system entity that hosts one or more software applications and/or content. The product platform 120 may include one or more servers 122 for hosting corresponding software application(s) and one or more databases 124 for storing application specific data. Examples of software applications hosted by the product platform 120 include collaborative applications (e.g., Confluence), software code management applications (e.g., Bitbucket), and issue tracking applications (e.g., JIRA). Jira, Confluence, and BitBucket are all offered by Atlassian, Inc. It will be appreciated that the software applications need not be offered by the same organization and that the presently disclosed SCS 140 can be used with any product platform configured to interact with the SCS 140.

In order to run a particular application, the server 122 includes one or more application programs, libraries, APIs, or other software elements that implement the features and functions of the application. In one example the product server 122 includes an event recording module 126 which monitors user account interactions with the product applications hosted by the server 122 and forwards records each of these user account interactions to the event platform 130 as an event record. The event recording module 126 may be configured to communicate the event records to the event platform 130 either as a continuous stream or in batches periodically.

The product platform 120 also stores product data. Product data generally includes: data defining the operation of the hosted application (for example, user accounts, user permissions, and the like); and application data (i.e., the content hosted/maintained by the application, which can be, for example, issue data (in Jira), page/document data (in Confluence), source code data (in BitBucket), etc.). The data is stored on and managed by database 124. Database 124 is provided by a database server which may be hosted by server 122, but is more typically hosted on a separate physical computer in communication (directly or indirectly via one or more networks) with the server 122.

While single server architecture has been described herein, it will be appreciated that each product platform 120 can be implemented using alternative architectures. For example, in certain cases a clustered architecture may be used where multiple server computing instances (or nodes) are instantiated to meet system demand. Conversely, in the case of small enterprises with relatively simple requirements, a product platform 120 may be a stand-alone implementation (i.e., a single computer directly accessed/used by the end user).

The event platform 130 is communicatively coupled to each of the product platforms 120 to receive event records and communicatively coupled to the SCS 140 to provide requested event records. In certain embodiments, the event platform 130 is designed based on a publish-subscribe model. That is, product platforms 120 send event records to the event platform 130 and consumers (such as the SCS 140) subscribe to the event platform 130 to receive certain type of event data from the event platform. In this model, the publishers categorize the event data into classes without knowledge of which subscribers there may be. Similarly, subscribers express interest in one or more classes of event data and only receive event data from the event platform 130 that is of interest to them. When the event platform 130 receives an event record, the event platform 130 matches the event record with all the subscribers who are subscribed to the event and makes a copy of the event data for each subscriber and stores a copy to the subscriber's queue or stream. In this case, each of the product platforms 120 may submit event data to the event platform 130 and the SCS 140 may subscribe to the event platform 130 to receive event data related to user account interaction with applications running on the product platform 120 and to receive event data whenever users make selections via a selector control displayed on a client device 110. StreamHub offered by Atlassian is one example of such an event platform 130.

The SCS 140 is configured to receive requests from the selector control clients 114 and respond to these requests. To this end, the SCS 140 includes a communication module 141, which is configured to receive recommendation requests from the selector control clients 114 and forward recommendations to display in the selector controls to the requesting selector control clients 114. In addition, the SCS 140 includes or is associated with a database 142 storing a collection of items corresponding to the selector control offered in the product clients 112. For example, if the selector control is provided to select a user, the database 142 includes the set of all the users that can be selected via the selector control. Similarly, if the selector control is provided to select a team, the database 142 includes the set of all the teams that can be selected via the selector control.

The SCS 140 also includes a search engine 144. The search engine 144 is configured to receive any search string input by a user in the selector control, search the database 142 for all database entries that match the search characters, and provide a list of these database entries. In addition, the SCS 140 includes or is associated with a feature calculation module 145, which computes features and a feature store 146, which stores the computed features.

Features are generated based on interaction between users and product applications. Generally speaking, users of client devices 110 are associated with a user account and generate electronic activity on the product clients 112. This activity includes any type of user account interaction with the product platforms 120, including interactions with content and/or software applications hosted by the product platform 120. Example interactions include creating or editing content, commenting on content, visiting web pages, sharing, liking, or viewing content, mentioning another user, assigning an issue to another user, etc. The feature calculation module 145 (in communication with the product platforms 120 and event platform 130) monitors this user account activity to generate features. It will be appreciated that the feature calculation module 145 continuously/periodically calculates features as interactions are detected and stores these calculated features in the feature store 146.

In certain embodiments, the feature store includes two sets of features-collaboration features (which are used by a collaboration module 148 to generate recommendations for the selector control when no search characters are provided) and machine learning features (which are utilized by a ranking module 149 when search characters are provided to rank a list of users that match the search characters).

In order to rank the list of users, the ranking module 149 includes one or more trained models. The models assign appropriate weights to the machine learning features to improve the accuracy of the ranking generated by the ranking module 149. Operation of the ranking module 149 and the models will be described in detail later.

Returning to FIG. 1, the SCS 140 also includes a training module 147 that is configured to receive feature data from the feature store 146 and event data from the event platform 130 to train the one or more models of the ranking module 149 and periodically update the models to more accurately rank items.

Although FIG. 1 illustrates all these systems as being part of the SCS 140, in certain embodiments, these systems may be independent of each other, hosted on different servers, and may communicate with one another when required.

As illustrated in FIG. 1, communications between the client devices 110, product platforms 120, the event platform 130 and the SCS 140 are via the communications network 150. For example, the client devices 110 may communicate with the product platforms 120 through a local area network (LAN) or a public network (e.g., the Internet). Furthermore, the product platforms 120 may communicate with the event platform 130 and the SCS 140 over open web protocols such as (HTTPS, REST, and JWT).

It will be appreciated that although only three client devices (110A, 110B and 110C) and two product platforms 120 have been illustrated, in operation, many more client devices 110 and product platforms 120 may be connected to the SCS 140 through the network 150.

Further to the systems shown in FIG. 1, the environment 100 may include an authentication system (not shown) that determines whether a user has permission to perform a particular action. The actions may include requesting data for a selector control, accessing a resource, editing a resource, etc. The authentication system receives permissions data from all the product platforms 120 and then determines whether a user is permitted to perform an action based on the permission data.

Further still, in some embodiments, the environment 100 may include an identity platform (not shown). Typically, in organizations, employees are identified by unique user identifiers. These might be the same as the user identifiers used by the employees for accessing the product platforms 120 or may be different from those identifiers. An identity platform manages and links the various user identifiers used by product platforms 120 in the network to the user identifiers used by the organization. This way identity can be federated across the entire platform. Further the identity platform may maintain personal user information for the users which it can share with the various product platforms when requested—e.g., the user name, position, organization division, years employed by the organization, date of birth, etc. The SCS 140 may query the identity platform from time to time to retrieve personal user information corresponding to user identifiers.

This section describes the features computed and utilized by the SCS 140 to generate ranked lists of items to forward to the selector control. In the remainder of the disclosure, the functions of the SCS 140 are described with respect to a user selector control—i.e., a selector control that allows users to select one or more users. This is done for the sake of clarity and it will be appreciated that the present disclosure is not limited just to user selector controls, but to any other selector controls that can be made more intelligent by predicting user selections based on context.

As described previously, the SCS 140 maintains machine learning features and collaboration features. The machine learning features are utilized by the ranking module 149 to rank a list of users matching a search string whereas the collaboration features are utilized by the collaboration module 148 to determine a list of users a given user collaborates with when a search string is not provided. In some embodiments, there is an overlap between the machine learning and collaboration features—i.e., the same feature may be utilized by the ranking module 149 and the collaboration module 148.

As used in this disclosure, the term feature refers to a measureable or observable piece of information relating to a particular type of user interaction. Typically, a feature records counts of the number of times users perform particular types of interactions. For example, collaboration features typically record counts of the number of times users interact with other users. Machine learning features typically record counts of the number of times a given user has interacted with a container or an object in a given time period, has mentioned other users in a given time period, or has been mentioned by other users in a given time period.

As noted previously, users (on their client devices 110 and through an associated user account) interact with content and/or applications hosted by one or more product platforms 120. Each time a user account interacts with a product platform 120 an event is generated. As referred to herein, an event is an interaction between a user account and content/applications hosted by product platforms 120. Examples of events include, without limitation: making a selection via a selector control, posting messages in an interactive chat application (e.g., Slack), a social media application, a forum, or a blog; liking, sharing, mentioning, or responding to posts; creating, editing, commenting on pages in a wiki (e.g., Atlassian Confluence), creating, assigning, approving issues in an issue tracking system (e.g., Jira), committing source code, approving pull requests, creating pull requests, etc., in an SCM system (e.g., Bitbucket), etc. This list of example events is non-exhaustive and any other type of interactions with the product platforms (e.g., opening a page, raising an incident ticket in an issue tracking application such as Jira) can also be considered within the scope of the term "event".

When an event is detected, the product platform 120 on which the event occurs generates information in respect of the event (in the form of an event record) and forwards this to the event platform 130. The event platform 130 then checks the event record to determine if the SCS 140 has subscribed to the information present in the event record. If the event platform 130 determines that the SCS 140 has subscribed to information in the event record, the event platform 130 forwards the record to the SCS 140.

In some embodiments, the SCS 140 may request the following information for each user account interaction event detected by the product platform 120 and received at the event platform 130—

Principal identifier—this is the unique user account identifier of the user that interacted with a product platform that generated the event, Product platform identifier—this is a unique identifier of the product platform on which the event was recorded—e.g., Jira, Confluence, Bitbucket.

Tenant Identifier—this is a unique identifier of the tenant associated with the product platform. In some cases, a particular organization may setup a single tenant and therefore have a single tenant identifier for a particular product platform. In other cases, an organization may setup multiple tenants and therefore have multiple tenant identifiers for a particular product platform.

Object identifier—the content that the user interacted with on the product platform 120 is referred to as an "object" in this disclosure. The object may be a page in Confluence, an issue in an issue tracking system Jira, a commit in a repo in a source code management system, etc. The object identifier is the unique identifier of the object the user interacted with when the event was generated.

Container identifier—this is the unique identifier of any hierarchical parent of the object. For example, in the case of Confluence, the parent of a page object may be a space and in the case of an issue management system, the parent of an issue object may be a project, a story, or an epic.

Timestamp—this indicates the date/time the event occurred.

Event type indicator—this field indicates the type of activity that generated the event record. Examples include, e.g., a selection event (i.e., an event generated when a user makes a selection via a selector control), object creation event (i.e., an event generated when an object is created), object edit event (i.e., an event generated when a user edits an object), a mention event (i.e., an event generated when a user mentions another user account in an object), a comment event (i.e., an event generated when a user posts a comment on an object), etc.

Selected user account (optional)—if the event corresponds to a user account selecting a user account via a selector control, user account identifiers of the one or more user accounts selected during the event are recorded.

In some embodiments, the SCS 140 may subscribe to all user interaction event records. In other embodiments, the SCS 140 may subscribe to specific types of interaction events. The type of interaction events requested depends on the types of selector controls the SCS supports.

Once the SCS 140 receives the event data, the SCS 140 (and in particular the feature calculation module 145) utilizes data from each received event record to populate one or more machine learning or collaboration features. In certain embodiments, the SCS 140 maintains different machine learning and collaboration feature sets for different product platforms. Accordingly, if two product platforms 120 are connected to the SCS 140 it may maintain two machine learning and collaboration feature sets—one for each platform. In some embodiments, the event data may also be sliced and diced based on the date and time of the events such that different features are created based on events that fall within certain time windows—e.g., last 7 days, 14 days, 30 days, 60 days, 90 days, etc.

In one example, the machine learning features can be divided into five categories—Mentionee features (i.e., features counting the number of times a user has been mentioned by other users), container/object update features (i.e., features counting the number of times a given container or object has been updated by users), container/object mention features (i.e., features counting per user mention frequency for a given container/object), container/object comment features (i.e., features counting the per user comment frequency for a given container/object), and creator/assignee/reporter features. Further, these five categories may be maintained separately for each product platform and/or for different time windows.

Each of these categories of machine learning features is described in the following sections.

In the example embodiments described in this disclosure, it is assumed that an organization has a single tenant identifier for a given product platform and therefore the recommendations provided by the SCS 140 are scoped based on tenant identifiers. If a user works across multiple tenants, the user is often provided different recommendations, which are personalized based on the user's interactions in each tenant. However, in other embodiments, the user recommendations can be computed across different tenants, which may be useful for organizations that set up different tenants for different business units. In this case, a user in the multi-tenanted organization will be provided the same recommendations, which are personalized based on the user's interactions across all tenants.

The mentionee feature set includes features pertaining to the frequency a user is mentioned by other users. This feature set includes a mentionee feature that indicates the frequency a user is mentioned by other users in total, an object mentionee feature that indicates the frequency a user is mentioned in a particular object and a container mentionee feature that indicates the frequency a user is mentioned in a particular container.

Table A illustrates an example 1 day mentionee feature. This feature is calculated for each user and shows the number of times a user has been mentioned by other users in the last 24 hours. This feature is calculated based on mention event records. From any given mention event record, the feature calculation module 145 retrieves the user identifier of the mentioned user.

TABLE A 1 day mentionee feature

| User ID | Count |
|---|---|
| dd155f790a4b09f8 | 5 |
| 2d16eb3587c36ebb | 2 |
| 7e304fb010115d40 | 7 |
| bdda8f8c35c2d858 | 3 |
| . . . | . . . |

In the example data structure, for each record, the following information is stored:

User ID—the unique identifier of the user that was mentioned

Count—a count of the number of times the user was mentioned in selection events in the last 24 hours.

Table B illustrates an example 30-day object mentionee feature. This feature is calculated for each user and shows the number of times a user is mentioned in a given object (e.g., an issue/page) in the last 30 days. This feature is also calculated based on the mention event records. From any given mention event record, the feature calculation module 145 retrieves the user identifier of the user that was mentioned and the object identifier of the object in which the user was mentioned.

TABLE B

| 30 day object mentionee feature | | |
|---|---|---|
| User ID | Object ID | Count |
| dd155f790a4b09f8 | 3874 | 5 |
| 2d16eb3587c36ebb | 3748 | 2 |
| 7e304fb010115d40 | 2813 | 7 |
| bdda8f8c35c2d858 | 8974 | 3 |
| | . . . | . . . |

In the example data structure, for each record, the following information is stored:

User ID—the unique identifier of the user that was mentioned in the object

Object ID—the unique identifier of the object

Count—a count of the number of times the user was mentioned in the corresponding object in the last 30 days.

The container mentionee feature is similar to the object mentionee feature. Instead of the object identifier, this feature includes the container identifier and stores a count of the number of times users are mentioned in a given container.

The update feature set includes features pertaining to the frequency an object (e.g., a page/issue) or a container (e.g., a space/project) is updated in a given duration.

Table C illustrates an example 14 day object update feature. This feature is calculated for each user and shows the number of times a user has updated a given object in the last 14 days. This feature is calculated based on the edit event data. From any given edit event record, the feature calculation module 145 retrieves the object identifier of the object that was edited and the user identifier of the user that performed the edit.

TABLE C

| 14 day object update feature | | |
|---|---|---|
| User ID | Object ID | Count |
| dd155f790a4b09f8 | 3874 | 5 |
| 2d16eb3587c36ebb | 3748 | 2 |
| 7e304fb010115d40 | 2813 | 7 |
| bdda8f8c35c2d858 | 8974 | 3 |
| | . . . | . . . |

In the example data structure, for each record, the following information is stored:

User ID—the unique identifier of the user that edited the object

Object ID—the unique identifier of the object

Count—a count of the number of times the user edited the corresponding object in the last 14 days.

The container update feature is similar to the object update feature. Instead of the object identifier, this feature includes the container identifier and stores a count of the number of times users edit a given container.

The mention feature set includes features pertaining to the frequency users are mentioned in an object (e.g., a page/issue) or a container (e.g., a space/project) in a given duration.

Table D illustrates an example 30 day object mention feature. This feature is calculated for each object and shows the number of times a user performs mentions in a given object in the last 30 days. This feature is also calculated based on the mention event data. From any given mention event record, the feature calculation module 145 retrieves the object identifier of the object in which a user was mentioned and the user identifier of the user that performed the mention.

TABLE D

| 30 day object mention feature | | |
|---|---|---|
| Object ID | User ID | Count |
| 3874 | dd155f790a4b09f8 | 5 |
| 3748 | 2d16eb3587c36ebb | 2 |
| 2813 | 7e304fb010115d40 | 7 |
| 8974 | bdda8f8c35c2d858 | 3 |
| . . . | | . . . |

In the example data structure, for each record, the following information is stored:

Object ID—the unique identifier of the object

User ID—the unique identifier of the user that performed the mention in the object.

Count—a count of the number of times the user performed mentions in the corresponding object in the last 30 days.

The container mention feature is similar to the object mention feature. Instead of the object identifier, this feature includes the container identifier and stores a count of the number of times users perform mentions in a given container.

The comment feature set includes features pertaining to the frequency users make comments in an object (e.g., a page/issue) or a container (e.g., a space/project) in a given duration.

Table E illustrates an example 7 day object comment feature. This feature is calculated for each user and shows the number of times a user has commented in a given object in the last 7 days. This feature is calculated based on the comment event data. From any given comment event record, the feature calculation module 145 retrieves the object identifier of the object in which a user made a comment and the user identifier of the user that made the comment.

TABLE E

| 7 day object comment feature | | |
|---|---|---|
| Object ID | User ID | Count |
| 3874 | dd155f790a4b09f8 | 5 |
| 3748 | 2d16eb3587c36ebb | 2 |
| 2813 | 7e304fb010115d40 | 7 |
| 8974 | bdda8f8c35c2d858 | 3 |
| . . . | | . . . |

In the example data structure, for each record, the following information is stored:

Object ID—the unique identifier of the object

User ID—the unique identifier of the commenter in the object

Count—a count of the number of times the user commented in the corresponding object in the last 7 days.

The container comment feature is similar to the object comment feature. Instead of the object identifier, this feature includes the container identifier and stores a count of the number of times users make comments a given container.

In addition to the features that indicate the frequency of events occurring, the SCS 140 also stores features that indicate the creator/assignor/reporter for a given object. For instance, it maintains an author feature that maintains the author/creator of each object in a product platform 120. To this end, for each event that is received, the feature calculation module 145 retrieves the object identifier and performs a lookup in the author feature. If a corresponding object identifier is present, the event is discarded. If the object identifier is not present, a new record is created in the feature for the object identifier and the corresponding author/creator identifier is added to the record (retrieved from the event record). In case the product platform 120 offers a workflow management application, the SCS 140 maintains similar features for assignees of each task or issue and for reporters of each task or issue. However, in the case of assignees/reporter features, the feature calculation module 145 does not discard new events for objects already recorded in the assignor/reporter features. Instead, the corresponding records are updated based on the assignor/reporter information in the new events. This is because assignors/reporters in workflow management applications can change over time.

In one embodiment, the SCS 140 maintains a user-to-user collaboration features, which indicates the frequency of collaborations between different pairs of users. In order to calculate this user-to-user collaboration feature set, the SCS 140 also maintains user-to-object/container feature sets and object/container-to-user feature sets. For each of these feature sets, it also maintains features based on event type—e.g., in the user-to-user feature set, it maintains, a co-edit feature (indicating the number of times two users have co-edited an object), a co-comment feature (indicating the number of times two users have co-commented on an object), and a mentions feature (indicating the number of times a user has mentioned another user in an object). Further still, these features may be divided into time windows, such that each event based feature includes a 14 day feature, a 30 day feature, and a 90 day feature. In order to calculate these event based user-to-user features, similar types of features may be present in the user-to-container feature set and in the container-to-user feature set.

Examples of these feature sets are described below.

Table F illustrates an example 14 day container create feature. This feature is calculated for each user and shows the number of times a user creates an object in a container (e.g., a space/project) in the last 14 days. This feature is calculated based on the create event record. From any given create event record, the feature calculation module 145 retrieves the user identifier of the user that created an object and the container identifier of the object the user created.

TABLE F 14 day container create feature

| User ID | Container ID | Count |
|---|---|---|
| dd155f790a4b09f8 | 3874 | 5 |
| 2d16eb3587c36ebb | 3748 | 2 |
| 7e304fb010115d40 | 2813 | 7 |
| bdda8f8c35c2d858 | 8974 | 3 |
| | . . . | . . . |

In the example data structure, for each record, the following information is stored:

User ID—the unique identifier of the user that created an object in the container Container ID—the unique identifier of the container the object belongs to Count—a count of the number of times the user has created objects in the corresponding container in the last 14 days.

Typically, when calculating the create feature, the feature calculation module 145 retrieves create event records for a selected time window and for each retrieved create event record from that time window, identifies the identifiers of the creator and the corresponding container. It then checks whether the pair of creator and container identifiers already exist in Table F. If the pair exists in the table, the corresponding count is incremented by one. Alternatively, if the pair of identifiers is not found in the table, a new record is created in the table for that pair of creator and container IDs and the count is recorded as 1. Next time the system encounters that pair of creator and container again, it does not create a new record, instead the count of the existing record is incremented by 1.

Similarly, a container edit feature is maintained. In this case, instead of maintaining a count of the number of times users create objects in the container, the feature maintains a count of the number of times users edit objects in the container.

As part of the collaboration user-to-container features, the feature store 146 may also maintain a similar container comment feature. This feature is calculated for each user and shows the number of times a user comments on objects in a given container (e.g., a space/project) in the given duration.

Further still, similar features may be maintained for user-to-object interactions in the last 14 days. For example, one feature may be maintained that counts the number of times each user edits a corresponding object in the last 14 days. In this case, the feature will include the identifiers of the user and the corresponding object edited by the user along with a count of the number of times the object has been edited by a given user. Similarly, another feature may be maintained that counts the number of times each user creates comments in a corresponding object in the last 14 days. In this case, the feature will include the identifiers of the user and the corresponding object in which the user commented along with a count of the number of times the user has commented in the object in the last 14 days.

In addition, data structures may be maintained for 30 day and 90 day user-to-container and user-to-object features for each product platform 120 associated with the SCS 140.

From the user-to-container and user-to-object features, for a given user, a list of all the containers and/or objects the user has interacted with can be obtained along with a list of the number of times the user has interacted with each container and/or object.

Table G illustrates an example 14 day user edit feature. This feature is calculated for each container and shows the users and the number of times each user updated an object in a container (e.g., a space/project) in the last 14 days. This feature is also calculated based on the edit event data and is similar to the container edit feature described above. From any given edit event record, the feature calculation module 145 retrieves the user identifier of the user that edited an object and the container identifier of the object the user edited.

TABLE G

| 14 day user edit feature | | |
|---|---|---|
| Container ID | User ID | Count |
| 3874 | dd155f790a4b09f8 | 12 |
| 3748 | 2d16eb3587c36ebb | 18 |
| 2813 | 7e304fb010115d40 | 5 |
| 8974 | bdda8f8c35c2d858 | 3 |
| . . . | | . . . |

In the example data structure, for each record, the following information is stored:

Container ID—the unique identifier of the container of which the object is part

User ID—the unique identifier of the user that edited an object in the container Count—the count of the number of times an object in the container has been edited by the user in the last 14 days.

Similarly, a container comment feature and a container mention feature may be maintained. In this case, instead of maintaining a count of the number of times users create objects in the container, the features maintain counts of the number of times users make comments in the container and mention other users in a container, respectively.

In addition to container-to-user features, the feature store 146 may maintain similar object-to-user features. For example, it may maintain an object-to-user update feature that is calculated for each object and shows the users and the number of times each user updated the given object in the last 14 days. In this case, the feature data structure stores object identifiers and corresponding user identifiers of users that have updated corresponding objects along with a count of the number of times each user has updated the corresponding object. Similarly, it may maintain an object-to-user comment feature that is calculated for each object and shows the users and the number of times each user made a comment in a given object in the last 14 days. It will be appreciated that these container-to-user collaboration features are similar to the object update and object comment machine learning features described above and in some cases, the system may only maintain one such feature that can be utilized by the collaboration module 148 and the ranking module 149 when required.

In addition, data structures may be maintained for 30 day and 90 day container-to-user and object-to-user features for each product platform 120 associated with the SCS 140.

From the container-to-user and/or object-to-user features, for a given container or object, a list of all the users that have interacted with the container or object can be obtained along with a list of the number of times each the user has interacted with each container or object.

The user-to-container/object and container/object-to-user features are easy to generate directly based on received events. However, user-to-user features are slightly more difficult to compute. Aside from events where a user mentions another user or a user assigns an issue to another user, there are few events that show direct user-to-user interaction. The user-to-user feature set captures relationships between users by joining individual creating/updating/mentioning/commenting events together through a common entity—such as an object or a container. For example, all the users who edited a given page/issue can be considered to have direct user-to-user interaction.

In one example, the user-to-user interaction feature set may include, for each product platform, different types of event type based use-to-user features and different types of time-window based features. Table H illustrates an example 14-day co-edit feature. This feature is calculated for every user and shows the number of times pairs of users have co-edited objects in a particular product platform in the last 14 days.

TABLE H

| 14 day co-edit feature | | | |
|---|---|---|---|
| Collab ID | User A ID | User B ID | Count |
| 2352 | dd155f790a4b09f8 | a60cbb92d049d43f | 56 |
| 2353 | 2d16eb3587c36ebb | 0e88ad13569bc1a7 | 40 |
| 2354 | 7e304fb010115d40 | 239fe457a6c97748 | 45 |
| 2355 | bdda8f8c35c2d858 | e21812980c8eafb7 | 34 |
| . . . | . . . | . . . | . . . |

In the example event data structure, for each unique event record, the following information is stored:

The collaboration identifier uniquely identifies the pair of users A and B. In one example, the collaboration identifier may be a simple combination of the user identifiers of the two user accounts it represents.

User A ID—the unique identifier of the first user in the pair

User B ID—the unique identifier of the second user in the pair

Count—the count of the total number of times users A and B have coedited objects.

Typically, when calculating this feature, the feature calculation module 145 retrieves a set of edit event records within a selected time window and for each edit event in the retrieved set identifies the identifiers of the user that made the edit and the identifier of the object and container in which the edit was made. Based on this, the feature calculation module 145 determines pairs of co-editing users. This can be done, for example, by performing a lookup in the 14-day user-to-container editing feature to retrieve a count of a number of times the given user has edited the given container. Then, a lookup is performed in the 14-day container-to-user editing feature to retrieve a list of all the other users that have edited the given container along with their corresponding edit counts. The feature calculation module 145 then forms pairs between the given user and all the other users retrieved from the 14-day container-to-user edit feature and either identifies these pairs in table H (if they already exist) or adds a record for the pair in table H (if the record doesn't exist). Then, for each user pair, the system determines the number of times each user in that pair has edited the container and selects the lower editing count as the count for that user pair. For example, if the given user has edited the container 12 times and user A has edited the container 2 times, the editing count for that user pair is considered two. If the lower editing count is for the given user, the user-to-user count in Table H is incremented. Otherwise, the record count is not updated.

Table I illustrates an example 14 day co-comment feature. This feature is also calculated for every user and shows the number of times pairs of users have co-commented on an object on a given product platform in the last 14 days.

TABLE I

| 14 day co-comment feature | | | |
|---|---|---|---|
| Collab ID | User A ID | User B ID | Count |
| 2352 | dd155f790a4b09f8 | a60cbb92d049d43f | 12 |
| 2353 | 2d16eb3587c36ebb | 0e88ad13569bc1a7 | 18 |
| 2354 | 7e304fb010115d40 | 239fe457a6c97748 | 5 |
| 2355 | bdda8f8c35c2d858 | e21812980c8eafb7 | 3 |
| . . . | . . . | . . . | . . . |

In the example data structure, for each record, the following information is stored:

- The collaboration identifier uniquely identifying the pair of users A and B.
- User A ID—the unique identifier of the first user in the pair
- User B ID—the unique identifier of the second user in the pair
- Count—the count of the number of times users A and B have co-commented on an object.

Typically, when a new comment event is received, it includes the identifier of the user that made the comment and the identifier of the object and container in which the comment was made. Based on this, the feature calculation module 145 determines pairs of users involved in commenting on that object. This can be done, for example, by performing a lookup in the 14-day user-to-container commenting feature to retrieve a count of a number of times the given user has commented in the given container. Then, a lookup is performed in the 14-day container-to-user commenting feature to retrieve a list of all the other users that have commented in the given container along with their corresponding comment counts. The system then forms pairs between the given user and all the other users retrieved from the 14-day container-to-user commenting feature and either identifies these pairs in table I (if they already exist) or adds a record for the pair in table I (if the record doesn't exist). Then, for each user pair, the system determines the number of times each user in that pair has commented in the container and selects the lower commenting count as the commenting count for that user pair. For example, if the given user has commented in the container 12 times and user A has edited the container 22 times, the commenting count for that user pair is considered 12. If the lower editing count is for the given user, the user-to-user count in Table H is incremented. Otherwise, the record count is not updated.

Table J illustrates an example data structure for a 14 day mention feature. This feature is also calculated for every user and shows the number of times a user mentions another user in the last 14 days. This feature is calculated based on the mention event data. From any given mention event record, the collaboration module 148 retrieves the user identifier of the user that generated the mention event (i.e., the mentioner) and the user identifier of the user mentioned by mentioner (i.e., the mentionee).

TABLE J

| 14 day co-mention feature | | | |
|---|---|---|---|
| Collab ID | Mentioner ID | Mentionee ID | Count |
| 2352 | dd155f790a4b09f8 | a60cbb92d049d43f | 12 |
| 2353 | 2d16eb3587c36ebb | 0e88ad13569bc1a7 | 18 |
| 2354 | 7e304fb010115d40 | 239fe457a6c97748 | 5 |
| 2355 | bdda8f8c35c2d858 | e21812980c8eafb7 | 3 |
| . . . | . . . | . . . | . . . |

In the example data structure, for each record, the following information is stored:

- The collaboration identifier uniquely identifying the pair of mentioner and mentionee.
- Mentioner ID—the unique identifier of the mentioning user
- Mentionee ID—the unique identifier of the mentioned user in the pair
- Count—the count of the number of times the mentioner has mentioned the mentionee in the last 14 days.

Typically, when a new mention event is received, the feature calculation module 145 retrieves the user identifiers of the mentioner and the mentionee(s), creates collaboration identifiers for the pairs of mentioner with each of the mentionees and checks whether any of the collaboration identifiers already exist in Table J. If the collaboration identifier exists in the table, the corresponding count is increased by one. Alternatively, if any of the collaboration identifiers are not found in the table, a new record is created in the table for that pair of users and the count is recorded as 1. Next time the feature calculation module 145 encounters that pair of mentioner and mentionee again, it does not create a new record, instead the count of the existing record is incremented by 1.

This feature shows the total count of mentions between a mentioner and mentionee pair. In some embodiments, the feature store 146 may also store user-to-user mention features per container and user-to-user mention features per object. In these cases, the data-structure may include an additional container identifier or object identifier column such that counts reflect the number of times a user has mentioned another user in a given container or a given object.

Similar data structures may be maintained for 30 day and 90 day user-to-user features for each product platform 120 associated with the SCS 140.

From the user-to-user features, for a given user, a list of all users that the user interacted with (e.g., edited objects with, commented on objects with, or mentioned) can be obtained along with a list of the number of times the corresponding user account interacted with each such user account. Based on this data, the collaboration module 148 can determine the top user accounts a given user collaborated with in a given time frame.

As all the machine learning and collaboration features described above store feature data for a given duration, they also maintain a timestamp each time a record count is incremented. Then, each day, the count corresponding to events older than the given duration are subtracted from the count field such that at any given time, these features only shows the count of interactions that occurred in the given duration.

The SCS 140 maintains separate features in each of the feature sets because the collaboration and event types they correspond to indicate different degrees of interaction/collaboration. For instance, co-editing a document with another user strongly indicates that the two users must be collaborating, whereas one user commenting on the same page as another user may not always indicate collaboration. A user from a different team could simply be viewing a page and make a comment which another user may respond to, but neither of those users may regularly collaborate with each other. Similarly, mentioning a user may not necessarily indicate that the two users collaborate often. For example, while working on a project, Bob may mention that he had heard that Alice (from a different team) had previously solved a similar problem, but this does not necessarily indicate that Bob and Alice work together. Similarly, co-creating or co-editing objects may strongly indicate that the users are affiliated with the corresponding objects, but commenting on objects may not necessarily indicate a strong affiliation. Therefore, when determining whether user A collaborates with user B, these features may be given different significance. In case the SCS 140 is configured to treat each of these collaboration types equally, a single user-to-user, user-to-container, and container-to-users feature may be maintained that each includes count of all types of interactions between users or between users and containers (without any differentiation).

Similarly, the SCS maintains the 14 day, 30 day and 90 day features because they offer different degrees of confidence. For example, if user A has only started interacting with user B in the last 7 days, the collaboration module 148 cannot confidently conclude that these users collaborate with each other often as it does not have enough historical data to make this prediction. Alternatively, if user A has interacted with user B constantly over the last 90 days, the collaboration module 148 can more confidently conclude that these users collaboration with each other often. In case the SCS 140 is configured to treat recent and historical collaborations equally, it may maintain a single time duration for each of the feature sets (without any differentiation).

The collaboration and/or machine learning features can be combined in multiple different ways depending on the type of selector control. For example, a selector control for selecting an assignee for a particular task may utilize features that strongly indicate the users that work in a particular container/object whereas a selector control for selecting a user/team to mention may utilize features that indicate the users that are typically mentioned in a particular container or object. As described previously, the ranking module 149 maintains different models for responding to different types of recommendation request. For example, it maintains an assign model of assigning issues to a user and a mention model for mentioning one or more users. It also maintains a generic model for all other types of recommendation requests.

In one embodiment, the ranking module 149 utilizes the following features for the assign model—

7 Day object comment feature
30 Day object edit feature
30 Day container mention feature
30 Day container edit feature
30 Day object mentionee feature
1 Day mentionee feature
30 Day mentionee feature
7 Day mentionee feature
14 Day container edit feature
30 Day container mention feature In one embodiment, the ranking module 149 utilizes the following features for the mention model—

30 Day Container mentionee feature
30 Day Container mention feature
7 Day Object comment feature
30 Day Container edit feature
30 Day object mentionee feature
30 Day object edit feature
30 Day mentionee feature
1 Day mentionee feature
Object Reporter/assignee/author feature In one embodiment, the ranking module 149 utilizes the 14 days, 30 days and 90 days user-to-user collaboration feature set for the generic model.

As described previously, the ranking module 149 utilizes machine learning models to generate recommendation scores for a given list of user identifiers. In particular, the machine learning models assign weights to the machine learning feature counts of the given list of user identifiers and computes aggregate scores based on the weighted machine learning features. In some embodiments a suitable ranking machine learning model may be utilized. Examples of such models include logistic regression models and neural networks.

Generally speaking, the machine learning models are generated based on training data. In one example, the training data includes the machine learning features calculated for hundreds or thousands of users. Based on this training data, the model is trained to rank users. To do this, a list of users is provided to the model along with the required order in which the users should be ranked by the model. The model retrieves the machine learning features for the given list of users and attempts to assign weights to the machine learning features such that the combined feature score for the given list of users matches the order in which the users should be ranked by the model. The assigned weights are then applied to a next list of users to calculate their total feature scores and rank the users. If the order of the user is incorrect, the model changes the machine learning weights to be more likely to product the correct ordering. This process is repeated numerous times with many lists of users and corresponding required ranking orders until the model can correctly determine the order of the users most of the times (e.g., 90%). Once this is achieved the model is considered trained.

In the present disclosure, the SCS 140 trains three models using this technique—an assignee model—i.e., a model for ranking users when the selector control is used for selecting a user to assign a task to, a mention model for ranking users when the selector control is used for selecting a user to mention, and a generic model for ranking users when the selector is used for any other purpose. In each case, the corresponding machine learning features are weighted to produce the desired results.

This section describes various methods and processes for populating a selector control, updating features, and training the ranking models. The methods will be described with respect to a user selector control for clarity. However, it will be appreciated that the embodiments of the present disclosure can just as easily be applied to other types of selector controls that can be personalized based on context data and the user operating the control, such as a control for selecting a team.

Figure 2:
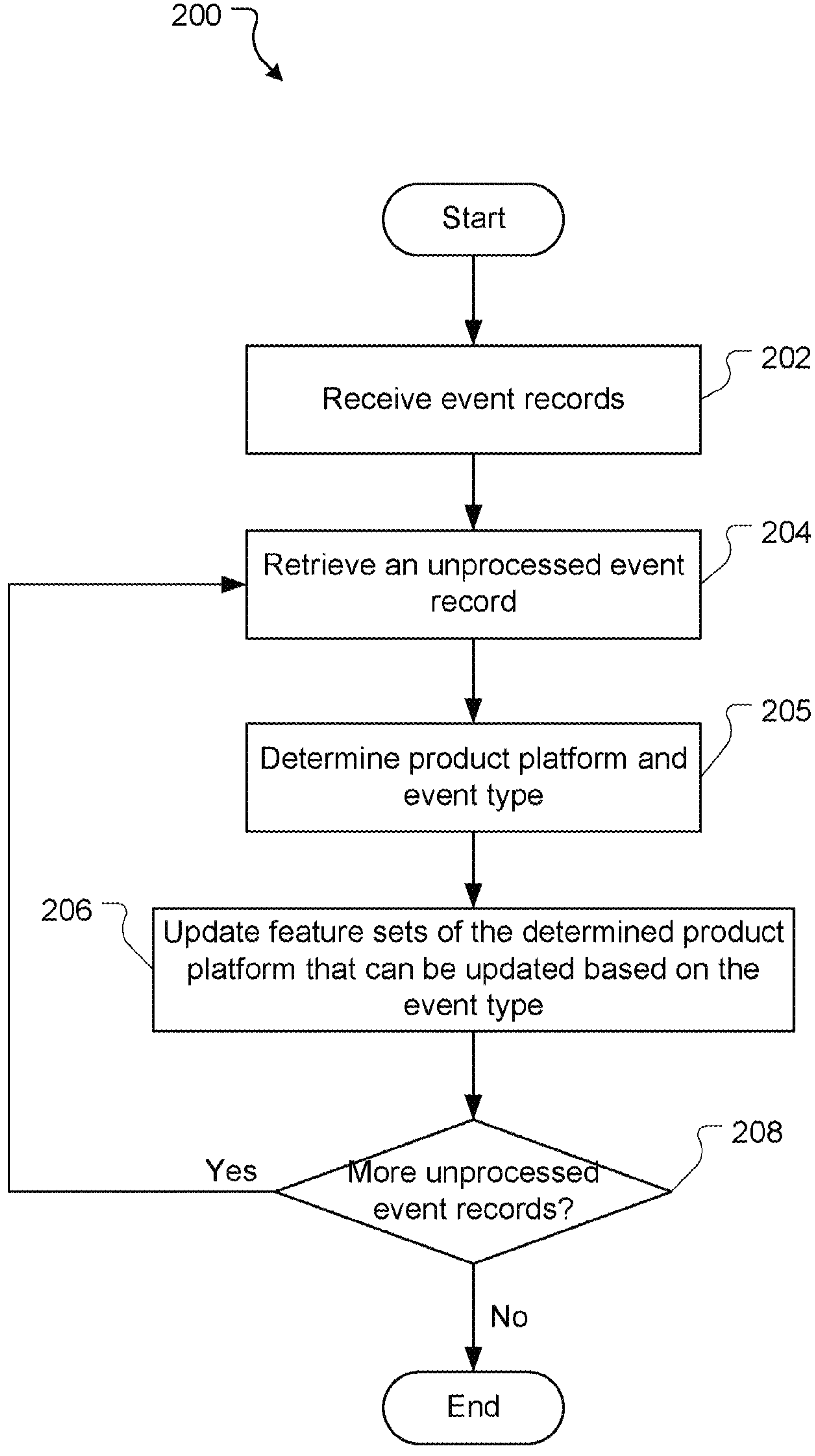
FIG. 2 is a flowchart illustrating a method for creating/updating features according to some embodiments of the present disclosure.

FIG. 2 illustrates an example method 200 for creating/updating features. Although method 200 is described with reference to a single calculation process, it will be appreciated that in practice this method is repeated periodically to calculate machine learning and/or collaboration features in a given time period.

The method begins at step 202, where event records corresponding to a particular time window (e.g., last one hour, last 6 hours, last 12 hours, last day, etc.) are received at the SCS 140. The selected time window depends on the manner in which the SCS 140 is configured. For example, in some cases the SCS 140 may be configured to recompute the features every hour and in other cases the SCS 140 may be configured to recompute the features every day. The selected recomputing frequency may depend on a number of factors such as computation power required for the computing, the available computation power of the SCS 140, etc.

In certain embodiments, the event platform 130 pushes event records to the SCS 140 either in real time (i.e., whenever an event occurs) or at predetermined intervals (e.g., every 15 minutes, every hour, etc.). In case event records are pushed at predetermined intervals, the feature calculation module 145 receives a batch of event records for events that were generated during that interval and stores these event records until it is time to compute the features.

In other embodiments, the SCS 140 may pull event records from the event platform 130 in real time, e.g., by utilizing webhooks (programmed into the software applications and tools hosted by the event platform 130) that notify the SCS 140 when events are available at the event platform 130 or by requesting the event platform 130 at predetermined intervals (e.g., every minute, every 5 minutes, etc.) to provide event records that were generated in that interval. The SCS 140 stores these event records until it is time to compute the features.

In any case, for the received event records, the SCS 140 receives relevant data in respect of the event which may, depending on the implementation, include metadata and/or content. In one example, the event record includes the data fields described previously.

At step 204, an unprocessed event record from the set of event records for that time window is selected.

At step 205, the object identifier associated with that unprocessed event record is retrieved from the event record and the feature calculation module 145 determines the product platform the event record is associated with and the type of event is represents. In certain embodiment, the product platform is identified based on the product platform identifier received as part of the event record and the event type is determined based on the event type identifier received as part of the event record.

Next, at step 206, the feature calculation module 143 updates the features maintained in the feature store 146 for the identified product platform using the selected event. Further, within the feature sets maintained for the identified product platform, the feature calculation module 143 updates the features that can be updated based on the identified event type. For instance, if the feature calculation module 145 determines that the event record is associated with product platform 120A and the event type is a mention event, it updates the machine learning mentionee features, and the machine learning object and container mention features. Further it updates the following collaboration features—the container-to-user mention features, the object-to-user mention features, the user-to-container mention features, the user-to-object mention features, and the co-mention features.

As described previously, if the feature calculation module 145 determines that a record already exists in any of the above identified features, it updates the count of the corresponding record. Alternatively, if the feature calculation module 145 determines that a record does not already exist in any of the above identified features, it adds a new record to the corresponding feature with a count of 1.

At step 208, the feature calculation module 145 determines whether any unprocessed event records exist in the event records retrieved at step 202. If it is determined that one or more unprocessed event records exist, the method returns to step 204. Alternatively, if a determination is made that no unprocessed event records remain, the method 200 ends.

As the features described above store feature data for a given duration, they also maintain timestamps of each time the features are computed/recomputed. Once method 200 is completed for a given time window, feature records maintained in the corresponding features that corresponds to events older than the given duration for that feature are removed from the features such that at any given time, these features only shows the count of interactions that occurred in the duration associated with the feature. For example, if a feature maintains counts of a collaboration type for a 14 day period and the periodicity of method 200 is 6 hours, at the end of method 200, feature counts that correspond to the first 6 hours of the 14 day period are subtracted from the total feature count such that a rolling 14 day feature count is maintained.

Method 200 is described where features are calculated periodically, in a batched fashion. In other embodiments, some or all of the features are calculated in a streaming fashion—i.e., in real time as events are generated and/or received at the SCS 140. Steaming feature calculation may be useful for shorter time window features—i.e., 1 hour features where the counts can quickly change or for non-time window features such as assignee/reporter/author features. For calculating features in the streaming fashion, a similar method is employed, but instead of receiving a batch of events and then executing steps 204-206 for each event record, method steps 204-206 are performed as and when event records are received at the SCS 140.

Accordingly, using method 200, the feature calculation module 145 creates and maintains the feature store 146. This feature store 146 is updated periodically based on the selected re-computation frequency. Furthermore, the features stored in this feature store 146 is subsequently analyzed to respond to recommendation requests from the selector control client 114. These functions will be described in detail in the following sections.

As described previously, a product platform 120 offers product applications to user of client devices 110. In some cases, these product applications include user interfaces that allow users to provide inputs. For example, a Confluence page typically includes a comment section and a text editor for writing a comment on the Confluence page. Similarly, a Jira issue has a comment section and text editor for adding a comment.

Figure 3A:
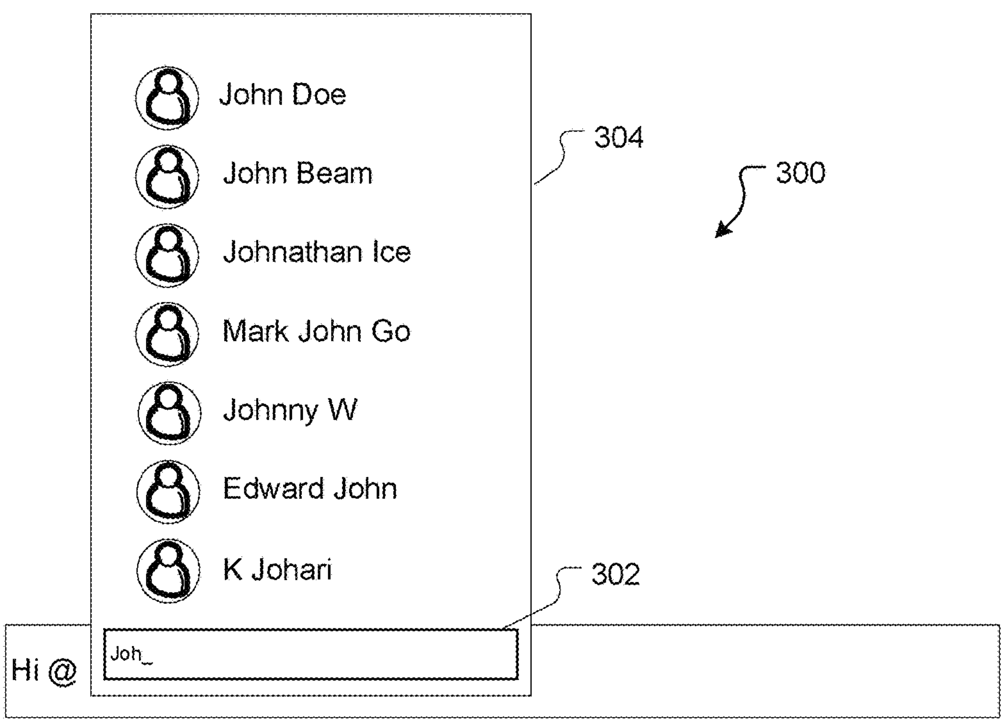
FIG. 3A is an example selector control used for mentioning a user.

While leaving a comment, users may sometimes "mention" another user. A mention is typically performed by adding the "@" symbol in the text editor. The text editor identifies this symbol and determines that the user plans to add a person's name after the "@" symbol. Typically, in such cases, the text editor displays a selector control in response to detecting the "@" symbol to provide a list of possible names that the user can select. FIG. 3A illustrates an example selector control 300, which includes a search string area 302 and a results area 304. As the user begins to add characters in the search string area 302, the results are filtered to match the characters provided by the user. Once the user has finished entering characters, the user can select one of the displayed names from the results area 304. This causes the mentioned user to be electronically tagged to the comment and/or Confluence page. Oftentimes, the mentioned user may also be alerted, so that the mentioned user can review the comment and respond (if required).

The selector control client 114 of the present disclosure can be employed in such text editors to provide an improved list of predicted users that the user may wish to mention.

Figure 3B:
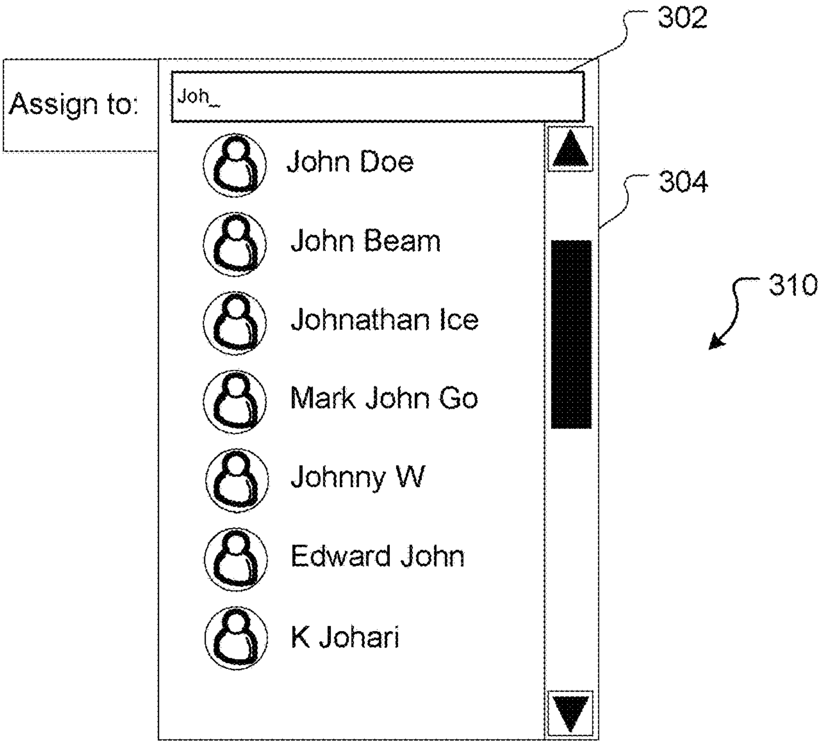
FIG. 3B is an example selector control used for assigning a task to a user.

Similarly, other user interfaces may also allow users to input a user name. For example, a user interface showing one or more Jira issues can include an input field to assign the one or more Jira issues to one or more people or a team. FIG. 3B illustrates an example selector control 310 for selecting a user to assign an issue to. When a user selects the input field for assigning the Jira issue(s) to a user, a selector control 310 is typically displayed to provide a list of possible names that the user can select as an assignee for the issues. As the user begins to add characters in the search string area 302, this list of possible names is filtered to match the characters provided by the user in the results area 304. Once the user has finished entering characters, the user can select one of the names displayed in the results area 304. The selector control client 114 of the present disclosure can be employed in such input fields to provide an improved list of predicted users that the user may wish to assign issues to.

It will be appreciated that these are merely examples and that there are many other examples of user interfaces that employ user selector controls and the SCS 140 of the present disclosure can be employed in any such user interfaces to provide more accurate list of users for selection than previously known selection control systems.

Figure 4:
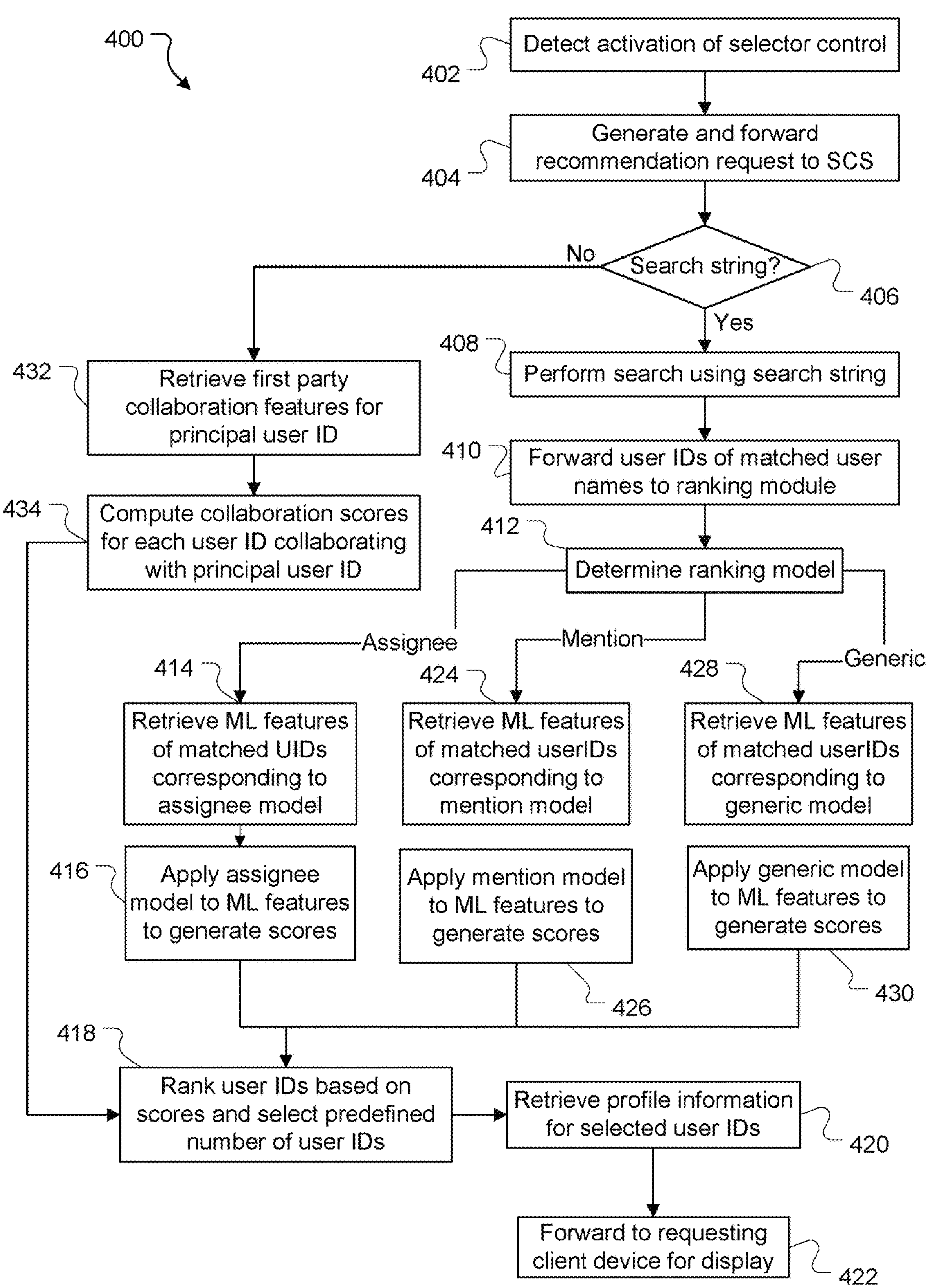
FIG. 4 is a flowchart illustrating an example method for using a selector control according to some embodiments of the present disclosure.

FIG. 4 illustrates an example method 400 for populating a selector control according to some embodiments of the present disclosure. The method begins at step 402, where a client device 110 detects activation of a selector control. In one example, the client device 110 (and in particular the application client 112) displays a user interface including a selector control on a display of the client device 110. At some point, the user of the client device 110 (referred to as the selector or principal user herein) interacts with the selector control. This may be done, e.g., by selecting an input field that is powered by the selector control client 114 or entering a special character in a text editor.

Once activation of the selector control is detected, the method proceeds to step 404, where the selector control client 114 generates a recommendation request and forwards it to the SCS 140 and in particular to the communication module 141 of the SCS 140. The recommendation request includes at least a—

- Field ID—this identifier indicates which machine learning model is to be utilized when ranking users. In certain embodiments, the product platform 120 can select from three available field IDs and corresponding models—assignee model, mention model, or generic model.
- Principal ID—this is the identifier of the user interacting with the selector control client.
- Product ID—indicates which product platform the recommendation request is associated with.
- Tennant ID—a unique value identifying the particular organization that is using the product platform. For example, if the product is Jira, and the organization using the Jira product is Microsoft, the Tennant ID uniquely identifies Microsoft.
- Search String—the search characters input by the user in the selector control at step 402.

In addition to this, the recommendation request may include additional contextual information, such as a container ID and/or object ID of the container and/or object in which the selector control client 114 is implemented and an indication of the maximum number of results that should be displayed in the selector control. It will be appreciated that the more context information provided as part of the recommendation request, the more accurate the results generated by the SCS 140 will be.

It will be appreciated that the amount of information and the type of information provided by the selector control client to the SCS 140 depends on configuration of the selector control client within the product platform 120 and in particular within the interface displayed by the product platform 120. For example, developers of some product platforms 120 may configure the selector control client to only retrieve the product and tenant identifier from the product platform 120 when the selector control is activated. In another example, developers may configure the selector control client to retrieve the project and object identifiers in addition to the product and tenant identifiers when generating the recommendation request. In addition, the product platform 120 provides the field identifier to the selector control client to insert in the recommendation request in some cases, but in other cases, the selector control client may be configured to insert a default value corresponding to the generic model.

At step 406, the communication module 141 receives the recommendation request and determines whether the request includes a search string. It will be appreciated that sometimes users might enter a search string in the selector control to quickly retrieve more relevant recommendations whereas other times they may not add any characters (e.g., because the principal user has forgotten the name of the user they wish to select and hope that the list of recommendations provided by the selector control may help jog their memory).

If a search string is provided as part of the recommendation request, the communication module 141 forwards a search request to the search engine 144 to retrieve a list of results that match the search string. In one embodiment, the search engine 144 may be a cross-product search engine that searches user databases maintained by different product platforms and tenants. Accordingly, in such cases, the search request includes the product and tenant IDs and the search string provided by the principal user.

At step 408, the search engine 144 performs a search based on the search string and limits this search to the databases 142 maintained for the product and tenant IDs provided as part of the search request. Based on the search, the search engine 144 identifies a list of user names that match the search query and forwards these to the ranking module 149. For example, if the search string entered by the principal user is "Joh" and the selector control is part of a Jira page for Microsoft, the search engine 144 searches for complete or partial matches of "Joh" in the user names stored in the Microsoft Jira username database 142. In one example, it may identify 50 user names that match the search string "Joh".

At step 410, the search engine 144 forwards user identifiers of the matched user names to the ranking module 149.

Next (at step 412), ranking module 149 determines the model to be used for the recommendation. As described previously, the SCS 140 may support multiple models. The model to be utilized for a particular recommendation is provided as part of the recommendation request (e.g., by the field identifier parameter). Accordingly, in one embodiment, the communication module 141 may retrieve the field identifier from the recommendation request and determine which model it corresponds to.

If a determination is made that the field identifier corresponds to the assign model at step 412, the method proceeds to step 414 where the ranking module 149 retrieves the machine learning features corresponding to the assign model from the feature store 146. In one embodiment, the ranking module 149 retrieves the list of machine learning features described previously as features utilized by the assign model. In particular, the ranking module 149 retrieves the product ID, container ID and/or object ID (if provided) from the recommendation request and the list of user identifiers received from the search engine 144 and retrieves records from the selected machine learning features that correspond to the product ID, container ID and/or object ID and the list of user IDs. For example, if the list of user IDs includes three users—Users A, B and C and the recommendation request includes the object identifier and project identifier associated with the selector control—the ranking module 149 retrieves the counts for all three of the users for each of the assign features as shown in table K below.

TABLE K

Example feature counts for three users

| Feature | User A | User B | User C |
|---|---|---|---|
| 7 Day object comment feature | 2 | 0 | 5 |
| 30 day object update feature | 1 | 0 | 1 |
| 30 day container mention feature | 8 | 2 | 9 |
| 30 day container update feature | 4 | 10 | 1 |
| 30 day object mentionee feature | 5 | 1 | 9 |
| 1 day mentionee feature | 4 | 8 | 2 |
| 30 day mentionee feature | 25 | 45 | 23 |
| 7 day mentionee feature | 14 | 18 | 12 |
| 14 day container update feature | 1 | 3 | 0 |
| 30 day container mentionee feature | 5 | 3 | 5 |

If the container or object identifiers are not provided as part of the recommendation request, the ranking module 149 would be unable to retrieve the update, mention and comment object and container features and may only be able to retrieve the mentionee features and in particular the mentionee features indicating the total count of the number of times users A, B and C have been mentioned in the last 24 hours, 7 days and 30 days.

Next (at step 416), the assign model is applied to the retrieved features to generate recommendation scores for the matching user identifiers. As described previously, the machine learning model assigns weights to each of the features and then computes a total recommendation score based on the weighted sum of each of the individual features.

Once the recommendation scores are generated, the ranking module 149 ranks the user identifiers at step 418 based on the recommendation scores and selects a predefined number of the user identifiers with the highest recommendations scores. In one embodiment, if the maximum number of results is specified as part of the recommendation request, the ranking module 149 selects the corresponding number of user identifiers. Otherwise, if the maximum number is not provided, a default predefined number (e.g., 5) of user identifiers are selected.

Next, at step 420, the SCS 140 retrieves user profile information for the selected user identifiers. As discussed until now, SCS 140 performs its analysis based on user identifiers. However, a list of user identifiers may not be useful to the principal user, as users typically do not remember user identifiers, but user names. Accordingly, at this step, the SCS 140 may submit the list of user identifiers to a system that maintains user profiles for the organization (e.g., an entity management system), and requests the system to return a list of user names and (in some cases), profile pictures of the users corresponding to the user identifiers.

Once the user names and/or profile pictures are retrieved, these are forwarded to the selector control client 114 at step 422, which causes the information to be displayed in the displayed selector control.

Returning to step 412, if a determination is made that the field identifier corresponds to the mention model at this step, the method proceeds to step 424 where the ranking module 149 retrieves the machine learning features corresponding to the mention model from the feature store 146. In one embodiment, the ranking module 149 retrieves the list of machine learning features described previously as features utilized by the mention model.

This is similar to step 414. Continuing with the same example described with reference to step 414, the ranking module 149 retrieves counts for users A, B and C for each of the mention features as shown in table L below.

TABLE L

Example feature counts for three users

| Feature | User A | User B | User C |
|---|---|---|---|
| 30 days mentionee feature | 12 | 10 | 15 |
| 90 days container update feature | 51 | 36 | 19 |
| 30 days object mention feature | 8 | 2 | 9 |
| 90 days object comment feature | 14 | 20 | 21 |
| 30 days container mention feature | 4 | 10 | 1 |
| 1 hour container mention feature | 2 | 0 | 5 |
| 30 days object mentionee feature | 25 | 45 | 23 |
| 60 days object update feature | 14 | 18 | 12 |
| 60 days container comment feature | 41 | 23 | 10 |
| Object Author/creator/assignee | 0 | 0 | 0 |

If the container or object identifiers are not provided as part of the recommendation request, the ranking module 149 would be unable to retrieve the update, mention and comment features and may only be able to retrieve the mentionee feature and in particular the mentionee feature indicating the total count of the number of times users A B and C have been mentioned in the last 30 days.

Next (at step 426), the mention model is applied to the retrieved features to generate recommendation scores for the matching user identifiers. As described previously, the mention machine learning model assigns weights to each of the features and then computes a total recommendation score based on the weighted sum of each of the individual features.

Once the recommendation scores are generated, method proceeds to step 418.

Alternatively, at step 412, a determination is made that the field identifier corresponds to the generic model at this step, the method proceeds to step 428 where the ranking module 149 retrieves the machine learning features corresponding to the generic model from the feature store 146. In one embodiment, the ranking module 149 retrieves the list of machine learning features described previously as features utilized by the generic model.

Next (at step 430), the generic model is applied to the retrieved features to generate recommendation scores for the matching user identifiers. As described previously, the generic machine learning model assigns weights to each of the features and then computes a total recommendation score based on the weighted sum of each of the individual features. Once the recommendation scores are generated, method proceeds to step 418.

Returning to step 406, if at this step, it is determined that the recommendation request does not include a search string, the method proceeds to step 432, where the collaboration module 148 retrieves the user-to-user feature counts for the principal user. To this end, the collaboration module 148 may provide the user identifier of the principal user to the feature store 146 and request the feature store 146 to forward all user-to-user feature counts for that particular principal user.

In one example, the feature store 146 may return the feature values shown in table M below—

TABLE M

| Retrieved first party user-to-user feature set counts | |
|---|---|
| Feature name | Users \| Count |
| Co-edit frequency 14 days | User A: 20, user B: 15, user C: 2, User D: 1 |
| Co-edit frequency 30 days | User A: 40, user B: 25, user C: 12, User D: 1 |
| Co-edit frequency 90 days | User A: 90, user B: 45, user C: 22, User D: 1 |
| Mention frequency 14 days | User A: 10, User B: 4, User E: 7 |
| Mention frequency 30 days | User A: 21, User B: 14, User E: 7, User F: 8 |
| Mention frequency 90 days | User A: 21, User B: 14, User E: 7, User F: 30 |
| Co-comment frequency 14 days | User A: 10, User C: 2, User H: 1 |
| Co-comment frequency 30 days | User A: 20, User B: 4, User C: 5, User H: 1 |
| Co-comment frequency 90 days | User A: 29, User B: 7, User C: 5, User H: 1 |

Although the information is shown in a table, this may not be the case. Instead, the collaborator user identifiers and corresponding counts for all the features may be provided in the form of a JSON file.

Once the collaboration module 148 receives the user-to-user feature counts, the method proceeds to step 434, where the collaboration module 148 computes a collaboration score for each of the collaborators identified in the retrieved user-to-user feature set count data. In the example shown in Table M, there is collaboration information for 7 distinct collaborators (users A-F and H). Accordingly, in this example, the collaboration module 148 computes collaboration scores for each of these 7 distinct collaborators.

In certain embodiments, the collaboration score of each collaborator may be computed by a simple addition of all of the individual counts over the 90 day period (as this includes the counts for the 30 days and 14 days windows). In this case, the collaboration scores for each of the seven collaborator may be as shown in table N below—

TABLE N

| Example Collaboration Scores | |
|---|---|
| Collaborator ID | Collaboration Score |
| User A | 140 |
| User B | 66 |
| User C | 27 |
| User D | 1 |
| User E | 7 |
| User F | 30 |
| User H | 1 |

However, such simple addition of the individual counts may not represent an accurate picture. For example, although User F has a higher collaboration score than user C, the type of interaction the principal user has had with User C (i.e., co-editing) may be more representative of actual collaboration that the type of interaction the principal user has had with User F (i.e., co-commenting). Accordingly, in some embodiments, weights may be applied to the various features to more accurately represent a collaboration score between the principal user and his/her co-collaborators. Table O illustrates example weights that may be applied to each of the features.

TABLE O

| Example weights for user-to-user feature set | | | | |
|---|---|---|---|---|
| Feature | Weight | 14 days | 30 Days | 90 days |
| Co-edit | 1.0 | 0.15 | 0.4 | 0.45 |
| Mention | 0.5 | 0.075 | 0.2 | 0.225 |
| Co-comment | 0.25 | 0.038 | 0.1 | 0.113 |

When these weights are adopted, the collaboration scores for each of the seven collaborator may be as shown in table P below—

TABLE P

| Example collaboration scores | |
|---|---|
| Collaborator ID | Collaboration Score |
| User A | 74.832 |
| User B | 39.691 |
| User C | 15 |
| User D | 1 |
| User E | 3.5 |
| User F | 8.35 |
| User H | 0.25 |

As can be seen, these scores represent a more accurate picture of the collaborators. For example, User C now has a higher collaboration score than User F which may be more indicative of the actual collaboration between the principal user and Users C and F.

Once the collaboration scores are computed, the collaboration module 148 arranges the list of users based on decreasing collaboration scores and select a predefined number of the top collaborators (at step 438). In one example, the predefined number may be a fixed number (e.g., 6) irrespective of the collaboration scores. In another example, the predefined number of top collaborators selected by the collaboration module 148 at this step may be based on a threshold collaboration score (e.g., 10). Collaborators that have a collaboration score higher than this threshold score may be selected and the remaining collaborators may be discarded.

The method then proceeds to step 418.

In the example process described above, if a query string is not provided as part of the request, the SCS 140 uses the collaboration features to directly identify one or more users to suggest in the selector control without utilizing the search engine 144. However, in some other implementations, the communication module 141 may forward an empty search request to the search engine 144 along with context information such as product and tenant IDs. In such cases, the search engine 144 may return a list of all the users associated with the product and tenant IDs associated with the request, and the ranking module 149 boosts the user identifiers retrieved from the search engine 144 based on the computed collaboration scores.

Further still, in some embodiments, user names and/or profile pictures are provided by the search engine 144. In such cases, method step 420 is not performed.

In the example method described above, the search engine performs searches based on keywords first and then the ranking module ranks the search results of the search engine using one or more of the models. In other examples, the ranking module may rank the users first and provide the ranked user identifiers to the search engine, which allows the search engine to boost certain user identifiers that match the query string and are ranked by the ranking module. This allows the search engine to incorporate the calculated scores from the model rather than solely relying on matching the text input. For large organizations, a search string like the letter "s" can match many results (more than the requested limit). In such cases boosting helps ensure that the results returned by the search engine are the most relevant to a given user. In such an implementation, method steps 408 and 410 are not performed. Instead, after step 412, the user IDs are provided to the search engine along with the search string and the search engine performs a boosted search based on the ranked user IDs and the search string.

The ranking models are trained from time to time to improve their accuracy in generating recommendation scores and providing the most likely user to be selected at the top of the list.

To do this, the SCS 140 stores selection events that have occurred when users have selected a desired user from the list of users provided by the SCS 140. As the ranking models are only applied in cases where a search string is provided, the SCS 140 stores the selection events that include search strings. Such selection events represents the ideal user identifier that should have been ranked highest by the ranking module 149 when the corresponding method 400 was performed.

In one example, based on the search string and other information available as part of the selection event, the SCS 140 reruns method 400, but retrieves the feature counts that correspond to the time at which the selection event occurred. As described previously, the features include timestamps that indicate the state of the feature counts at different points in time. Therefore, the system can retrieve the state of the features at the time the selection event occurred. It then compares the ranked list of user identifiers obtained by re-running method 400 and the user identifier selected by the user. If the selected user was displayed at the top of the ranked list, the SCS ends the retraining. However, if the selected user was not displayed at the top of the ranked list, the system retrains the model to change the weights applied to the various features associated with that particular selection event to ensure the selected user would be given the highest recommendation score. This process is repeated using a number of selection events and corresponding machine learning features periodically to make sure the models compute recommendation scores and identify users that are most likely to be selected from the selector control.

In another example, data about usage of the selector control is collected. This includes, e.g., for given context information (object, container, principal user, time), the final selection made by the principal user. The feature calculation module 145 then identifies the state of the features in the feature store at the time the selection was made (i.e., the counts of the various features maintained by feature store at the time the selector control was used). A suitable machine learning training algorithm is then executed to fine tune one or more of the models based on these parameters.

The operations/techniques described herein are implemented by one or more special-purpose computing systems or devices. For example, in environment 100: the SCS 140 may be provided by one or more computer systems; each client device 110 is a computer system; and each of the product servers 122 are provided by one or more computing systems.

The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 5:
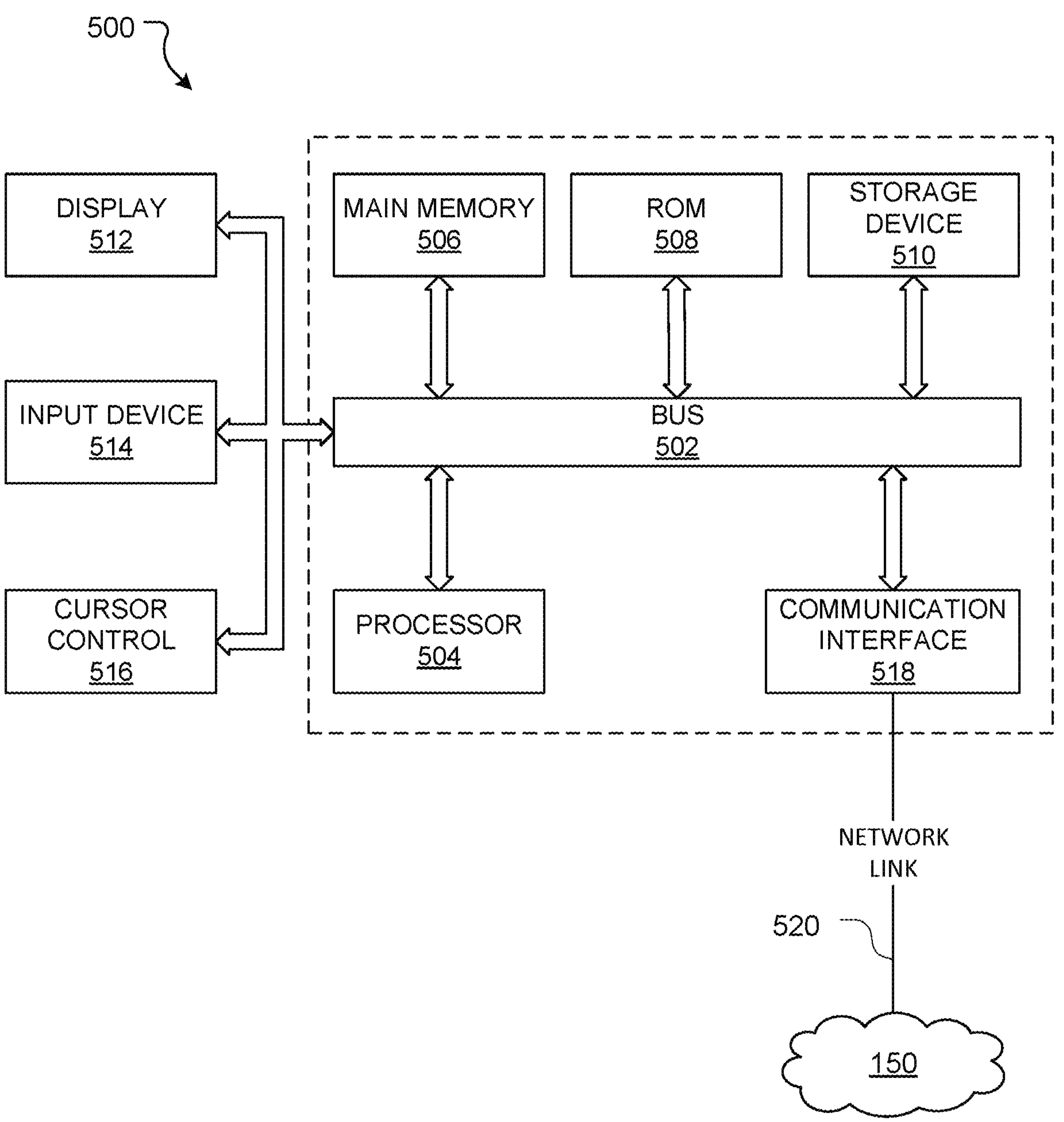
FIG. 5 is a block diagram of a computing system with which various embodiments of the present disclosure may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions. If the computer system 500 is part of the SCS 140, the storage device 510 may store the database 142 and the feature store 146.

In case the computer system 500 is the client device 110, it may be coupled via bus 502 to one more output devices such as a display 512 for displaying information to a computer user. Display 512 may, for example, be a cathode ray tube (CRT), a liquid crystal display (LCD), a light emitting diode (LED display), or a touch screen display. An input device 514, including alphanumeric and other keys, may be coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that permits the device to specify positions in a plane. Additional and/or alternative input devices are possible, for example touch screen displays.

According to one embodiment, the methods disclosed herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to network 150. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks 150 to other computing systems. For example, if the computer system 500 is part of the SCS 140, the network link 520 may provide a connection through network 150 to the event platform 130 or product platforms 120.

Computer system 500 can send messages and receive data, including program code, through the network(s), network link 520 and communication interface 518. In the SCS example, it may receive event data through the network 150 and communication interface 518 from the event platform 130.

The processor 504 of the SCS 140 may execute the received event data as it is received, and/or store it in storage device 510, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including", "includes", "comprising", "comprises", "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

The invention claimed is:

1. A computer-implemented method comprising:

in response to receiving a text input with respect to a first selector control of a client application instantiated with respect to a user account having a unique identifier, generating a search query including the unique identifier and at least a portion of the text input;

providing the search query to a selector control system to obtain a set of entries;

providing the set of entries to a first ranking module associated with a first selector type of the first selector control to obtain a first set of recommendation scores;

generating a first set of ranked entries based on the set of entries and the first set of recommendation scores;

transmitting the first set of ranked entries to the first selector control, thereby causing the client application to display the first set of ranked entries;

in response to receiving the text input with respect to a second selector control of the client application different than the first selector control, providing the set of entries to a second ranking module associated with a second selector type of the second selector control to obtain a second set of recommendation scores;

generating a second set of ranked entries based on the set of entries and the second set of recommendation scores, the second set of ranked entries different than the first set of ranked entries; and transmitting the second set of ranked entries to the second selector control, thereby causing the client application to display the second set of ranked entries.

2. The computer-implemented method of claim 1, wherein subsequent to transmitting the first set of ranked entries to the first selector control, the method comprises:

receiving a user selection of a particular entry of the first set of ranked entries;

generating a selection event record indicating the text input and the particular entry; and retraining a machine learning model of the first ranking module associated with the first selector type using the selection event record.

3. The computer-implemented method of claim 2, wherein subsequent to retraining the machine learning model, the method further comprises:

receiving the text input with respect to the first selector control;

querying the first ranking module associated with the first selector type to obtain a third set of recommendation scores for the set of entries;

generating a third set of ranked entries based on the set of entries and the third set of recommendation scores, the third set of ranked entries having the particular entry promoted within the third set of ranked entries as compared to the first set of ranked entries; and transmitting the third set of ranked entries to the first selector control, thereby causing the client application to display the third set of ranked entries.

4. The computer-implemented method of claim 1, wherein causing the client application to display at least one of the first set of ranked entries or the second set of ranked entries includes selecting a subset of at least one of the first set of ranked entries or the second set of ranked entries in accordance with a predefined maximum number of results.

5. The computer-implemented method of claim 4, wherein prior to causing display of the first set of ranked entries or the second set of ranked entries, the method further comprises determining the predefined maximum number of results based on a number of recommendation scores within at least one of the first set of recommendation scores or the second set of recommendation scores meeting a minimum threshold recommendation score.

6. The computer-implemented method of claim 1, wherein each of the first selector type and the second selector type is at least one of an assignee type, a mention type, or a generic type.

7. The computer-implemented method of claim 1, further comprising:

in response to receiving a selection of a particular entry from at least one of the first set of ranked entries or the second set of ranked entries, generating a notification; and transmitting the notification to a particular user device associated with the particular entry.

8. A computer-implemented method comprising:

in response to receiving a text input with respect to a first selector control of a client application instantiated with respect to a user account, generating a search query including at least a portion of the text input;

providing the search query to a selector control system to obtain a set of entries;

providing the set of entries to a first machine learning model of a ranking module, the first machine learning model associated with a first selector type of the first selector control, to obtain a first set of recommendation scores;

generating a first set of ranked entries based on the set of entries and the first set of recommendation scores;

transmitting the first set of ranked entries to the client application, thereby causing the client application to display the first set of ranked entries with respect to the first selector control;

in response to receiving the text input with respect to a second selector control of the client application different than the first selector control, providing the set of entries to a second machine learning model of the ranking module, the second machine learning model associated with a second selector type of the second selector control, to obtain a second set of recommendation scores;

generating a second set of ranked entries based on the set of entries and the second set of recommendation scores, the second set of ranked entries different than the first set of ranked entries; and transmitting the second set of ranked entries to the client application, thereby causing the client application to display the second set of ranked entries with respect to the second selector control.

9. The computer-implemented method of claim 8, wherein:

the client application is an issue tracking application comprising an issue view interface;

the issue view interface includes the first selector control and the second selector control, wherein the first selector control is an assignee selector control and the second selector control is a mention selector control.

10. The computer-implemented method of claim 9, wherein the assignee selector control is displayed with respect to one or more particular issues of the issue view interface; and in response to receiving a user selection of a particular entry in the first set of ranked entries, assigning the one or more particular issues to a particular user account corresponding to the particular entry.

11. The computer-implemented method of claim 9, wherein the mention selector control is displayed proximate to a comment editor region for a particular issue of the issue view interface; and in response to receiving a user selection of a particular entry in the second set of ranked entries, inserting a mention for a particular user account corresponding to the particular entry in the comment editor region.

12. The computer-implemented method of claim 11, wherein subsequent to inserting the mention for the particular user account, the method further comprises:

identifying a particular user device associated with the particular user account corresponding to the particular entry;

generating a notification indicating the particular issue; and transmitting the notification to the particular user device associated with the particular user account.

13. The computer-implemented method of claim 8, wherein subsequent to transmitting the first set of ranked entries to the first selector control, the method comprises:

receiving a user selection of a particular entry of the first set of ranked entries;

generating a selection event record indicating the text input and the particular entry; and retraining the first machine learning model using the selection event record.

14. The computer-implemented method of claim 8, wherein:

the first machine learning model corresponds to a first set of features comprising at least one of:

a comment feature; and
an edit feature; and
the second machine learning model corresponds to a second set of features comprising at least one of:
a mention feature; and
a mentionee feature.

15. A computer processing system comprising:
one or more processing units;
one or more communication interfaces; and
a non-transitory computer-readable storage medium storing sequences of instructions, which when executed by the one or more processing units, cause the one or more processing units to:
cause instantiation of a client application of a product platform with respect to a user account having a unique identifier;
cause display, within the client application, of a user interface comprising a first selector control and a second selector control;
in response to receiving a text input via the first selector control:
provide at least a portion of the text input to a selector control system to obtain a set of entries;
provide the set of entries to a first machine learning model associated with a first selector type of the first selector control to obtain a first set of recommendation scores; and
generate a first set of ranked entries based on the set of entries and the first set of recommendation scores;
cause display, within a first selection menu of the user interface, of the first set of ranked entries;
in response to receiving the text input via the second selector control:
provide the set of entries to a second machine learning model associated with a second selector type of the second selector control to obtain a second set of recommendation scores;
generate a second set of ranked entries based on the set of entries and the second set of recommendation scores, the second set of ranked entries different from the first set of ranked entries; and
cause display, within a second selection menu of the user interface, the second set of ranked entries.

16. The computer processing system of claim 15, wherein:
the first selector control is an assignee selector control displayed proximate to a content item of the user interface; and
the first selection menu is a dropdown menu of the first selector control.

17. The computer processing system of claim 16, wherein:
the second selector control is a mention selector control displayed proximate to the content item of the user interface; and
the second selection menu is a dropdown menu of the second selector control.

18. The computer processing system of claim 15, wherein the sequences of instructions, when executed by the one or more processing units, further cause the one or more processing units to:
receive a user selection of a particular entry of at least one of the first set of ranked entries or the second set of ranked entries; and
retrain at least one of the first machine learning model or the second machine learning model using the particular entry.

19. The computer processing system of claim 15, wherein the first set of ranked entries and the second set of ranked entries are displayed in accordance with a predefined maximum number of results.

20. The computer processing system of claim 15, wherein:
each entry of the first set of ranked entries corresponds to a respective avatar icon; and
each entry of the first set of ranked entries is displayed within a respective selectable element including the respective avatar icon.

* * * * *